March 3, 1936.  A. N. GOLDSMITH  2,032,410

MOTION PICTURE

Filed Dec. 6, 1933  2 Sheets-Sheet 1

INVENTOR
ALFRED N. GOLDSMITH
BY
ATTORNEY

March 3, 1936.                A. N. GOLDSMITH                2,032,410
                              MOTION PICTURE
                            Filed Dec. 6, 1933            2 Sheets-Sheet 2
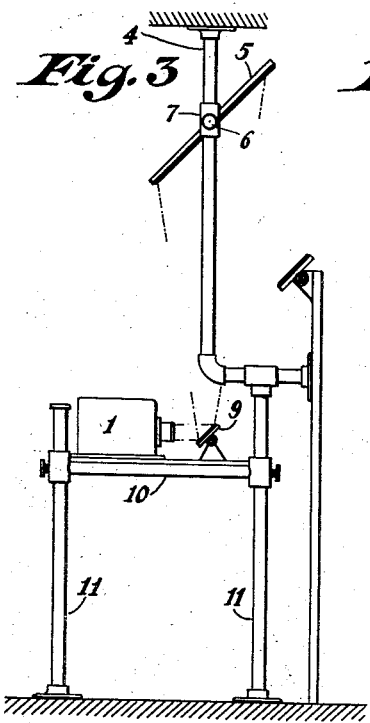
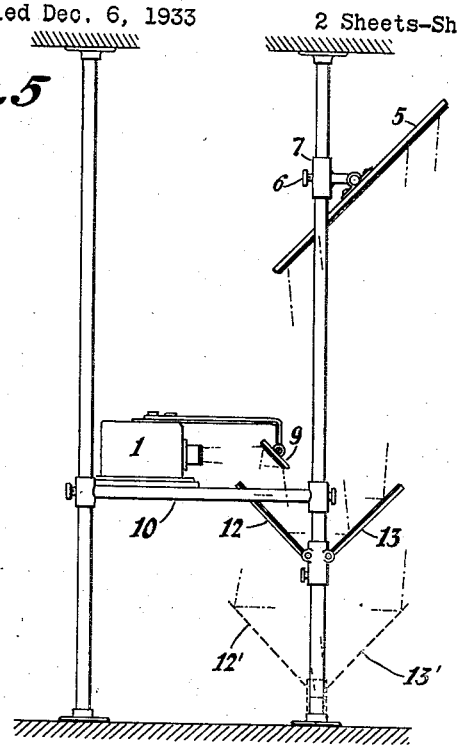
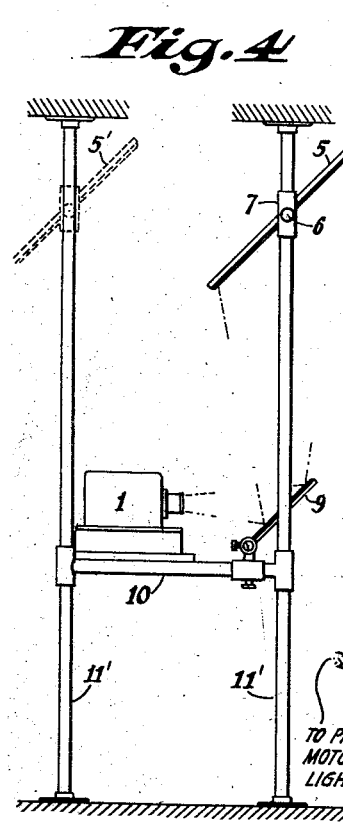
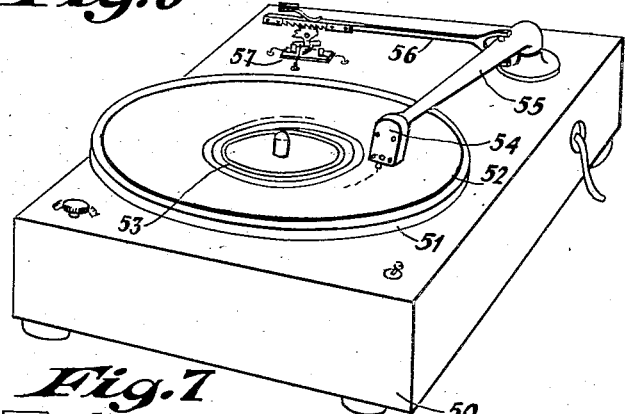
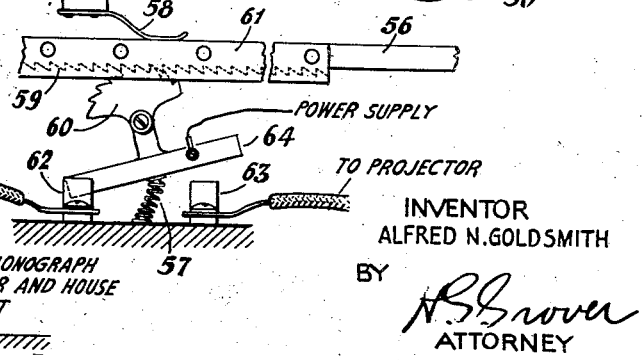
INVENTOR
ALFRED N. GOLDSMITH
BY
ATTORNEY Patented Mar. 3, 1936

2,032,410

UNITED STATES PATENT OFFICE 2,032,410

MOTION PICTURE

Alfred N. Goldsmith, New York, N. Y., assignor to Radio Corporation of America, a corporation of Delaware Application December 6, 1933, Serial No. 701,129

4 Claims. (Cl. 88—16.2)

This invention relates to motion picture theatres, a novel picture projecting mechanism for use therewith, and a novel arrangement of the projection apparatus in relation to the theatre. In motion picture theatres as heretofore constructed, large, cumbersome, and expensive projectors have been used in connection with 35 mm. nitro-cellulose film. Since such film is not only highly inflammable but is even explosive under some conditions, projecting apparatus is practically everywhere required by law to be enclosed in a fire-proof projection roof from which no fire or smoke could be communicated to the rest of the theatre. It is impractical to handle the film on reels carrying more than about 2,000 feet. In order to provide a show of any appreciable length, two or more projectors must be provided with mechanisms for switching from one projector to the other,—and at the same time switching over the sound reproducing mechanism,—so as to prevent any interruption during the show.

It will be apparent that such an installation as above described is extremely expensive and usually can be housed only in especially constructed buildings.

There has been for many years a demand for small theatres of inexpensive construction on which a small admission fee could be charged but which at the same time would be safe from fire and economical in operation.

One object of my invention is to provide such a theatre which can be operated at a relatively low expense.

Another object of my invention is to provide such a theatre which is safe from fire.

Another object of my invention is to provide means whereby any ordinary auditorium or other room sufficiently large can be readily converted into a motion picture theatre.

Another object of my invention is to provide a device which may be installed in any appropriate auditorium and which will project a picture of predetermined size largely independent of the distance from the projector to the screen.

Another object of my invention is to provide such a theatre which can be completely operated by a single attendant.

Referring now to the drawings:

Figs. 3, 4 and 5 illustrate modified arrangements of the mirrors.

Figs. 6 and 7 illustrate an automatic stopping mechanism for the phonograph which also serves to control the projector.

Figure 1:
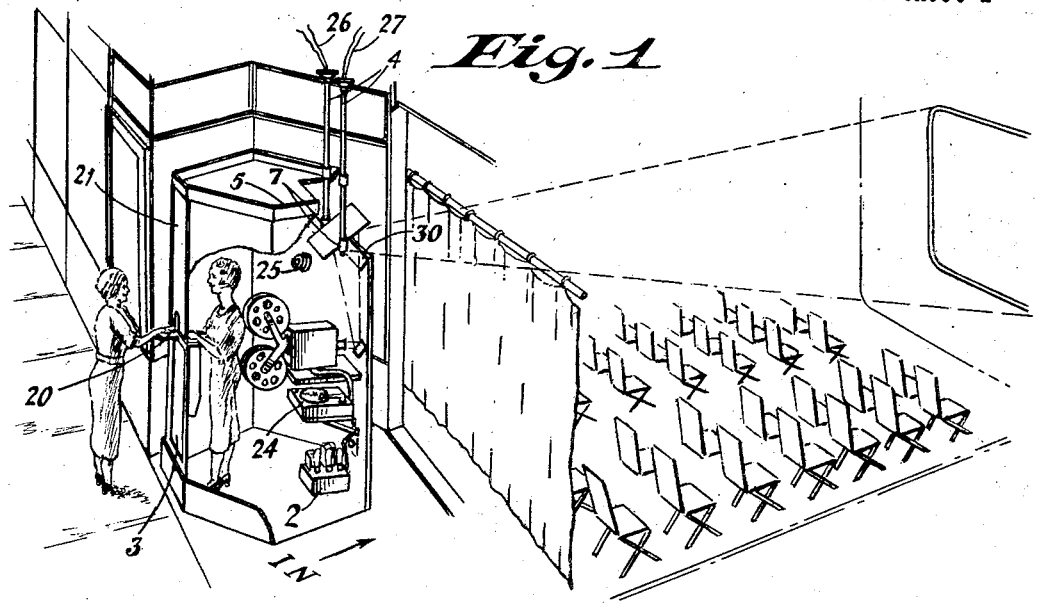
Fig. 1 is a longitudinal view, partly cut away, of my improved theatre and projection booth.

There have been recently developed motion picture projectors using 16 mm. film and provided with illumination of sufficient intensity to permit the projection of pictures as large as 9×12 feet. Such a projector is indicated at 1 in Fig. 1. In combination with such projector, there is provided a sound pick-up for photoelectrically reproducing sound records recorded upon the film, such sound pick-up being included in the mechanism of the projector indicated at 1, and the output therefrom being transmitted to the amplifier 2 which in turn actuates loudspeakers located behind the projection screen in the usual manner. The projector and sound pick-up 1 and the amplifier 2 are together housed in a novel projection booth generally indicated at 3. The use of only one projector is for the reason that with 16 mm. film, 400 feet is the equivalent of a thousand foot reel of 35 mm. film. It is therefore possible to put a complete show comprising newsreel, feature and comedy on a single reel of film 4,000 to 5,000 feet in length and having a playing time of approximately two hours. Such a reel of film weights no more than the usual 2,000 ft. reel of 35 mm. film. Since the 16 mm. film is not inflammable, it is possible to make the projection booth of any appropriate material, and the necessity for complete segregation of the booth from the audience is avoided. Highly advantageous structural changes in the booth are therefore made possible.

It is desirable that my apparatus should be capable of use in rooms of various lengths, but at the same time the screen is substantially uniform in size, and it is desirable that the picture should substantially fill the screen. With the lens of given focal length, this result is only accomplished when the screen is at a uniform distance from the projector as otherwise the image on the screen would not be in focus if it were of the predetermined size. Since this focal distance is fixed by the focal length of the lens and the size of the screen, while the length of the room cannot be conveniently predetermined in the manufacture of the apparatus, I maintain this focal distance constant by changing the path which the light follows to a path other than a straight line. This optical path can be increased materially in length by the provision of one or more reflectors adjustable in position and serving to increase the length of this optical path beyond the length of a straight line from the projector to the screen. Therein lies one of the most important structural features of my improved booth which will next be described in detail:

Either attached to the top of the room and extending downwardly or attached to the booth and extending upwardly, but preferably attached to both the ceiling of the room and to the booth in order to provide a more rigid construction, are two rods or tubes 4 constituting a pair of guides. Adjustably mounted on these guides is a mirror 5 which can be moved up or down upon the guides or rotated about an horizontal axis, parallel with the projection screen. The mirror can be clamped in any adjusted position by means of a handle 6 on each of the mirror mountings 7 which slide on the guides 4.

The guides 4 may be made in sections so as to be adaptable to any ceiling height, and in this case are joined by suitable couplings 8.

It will be apparent that my mirror 5 may be adjusted to any height from the height at which the beam just clears the heads of the seated patrons (or lower, if a clear path for the beam is provided), up to the height of the ceiling. This vertical adjustment permits a corresponding change in the image distance, i. e., a variation from a height of about five feet from the floor to an average height of about fifteen feet, or about ten feet.

The variation in length of rooms suitable will not usually amount to more than ten feet, and the apparatus is therefore practically of universal focus. However, if this limit of variation is exceeded the projection lens may be changed to one of greater or less focal length, and my apparatus will provide means for securing a picture of exact predetermined dimensions despite the relatively large differences in focal length between successive types of commercial projection lenses.

As stated above, the mirror 5 may be rotated in the mountings 7, and this adjustment is used to maintain the picture in the proper position on the screen irrespective of the vertical adjustment of the mirror.

Any trapezoidal distortion of the picture caused by the raised position of the mirror may be compensated for by any or all of the usual expedients such as tilting the screen, tilting the aperture in the projector, etc.

If it is desired to adapt the before described apparatus to an even greater focal range, the adjusting means diagrammatically shown in side elevation in Fig. 3 may be used. In this form of the device, the projector support 10 is made vertically adjustable on the rods or legs 11, of which four are preferably provided, and the range of adjustment is increased by the vertical adjustment of the projector together with its deflecting mirror 9.

An arrangement somewhat more flexible in adjustment than that of Fig. 3 may be provided as shown in Fig. 4, where both the projector 1 with its mirror 9, and the mirror 5 are adjustable the entire height of the room, and the mirror 9 is adjustable on the member 10. In this device the focal distance, the height of the light-beam, the angle of the light beam, and the distance of the projector from the floor are independently adjustable, within the limits of the apparatus. In this form of the device, trapezoidal distortion may be corrected by shifting the mirror 5 to the position 5′ and so adjusting the positions of the mirrors 9 and 9′ that their angles of reflection are equal with the mirror 5′ as far back of the aperture as the mirror 9 is in front of it.

A form of the device having an even greater range of adjustment than that of Fig. 4 is shown in Fig. 5. In this modification, the mirror 9 is inverted so as to throw the beam downwardly onto the mirror 12. The mirror 12 directs the beam horizontally onto the mirror 13, which directs it upwardly onto the mirror 5.

The mirrors 12 and 13 are adjustable to any position downwardly from the projector, and the mirror 5 is adjustable to any position upwardly from the projector, while the projector mount 10 is adjustable to any height between the extreme adjustments of the mirrors 5 and 12, 13.

It will be apparent that adjustment of the mirrors 12 and 13 as for example to the positions 12′ and 13′ will change the image distance by twice this amount. The maximum increase in image distance available is twice the distance from the floor to the ceiling of the room, while within this limit all the independence of adjustments of the device of Fig. 4 is retained.

Referring again to Figs. 1 and 2 showing the general arrangement of the theatre, it will be noted that the projector and auxiliary apparatus is located at the booth generally indicated at 3. This booth is provided with an appropriate wicket 20 which may be of any desired type, and above this wicket is the glass panel 21. This glass panel is preferably of the bullet-proof type while the wicket is preferably made according to one of the "anti-holdup" types, and the booth itself is preferably made of steel, all for the reason that only a single attendant is necessary otherwise for the operation of the theatre, and such precautions are therefore advisable. The wicket is preferably used only for the purpose of making change, for a reason which will hereinafter appear, but it may, of course, be used for the collection of admissions.

One of the sides of the polygonal booth is hinged to provide entrance and exit for the attendant.

Figure 2:
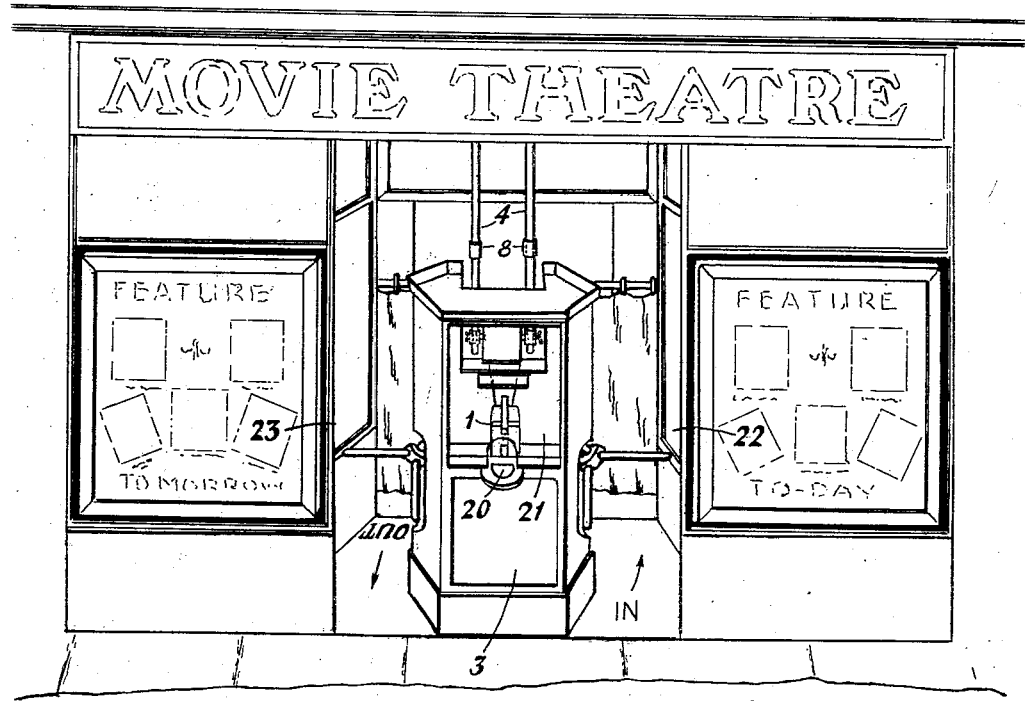
Fig. 2 is an exterior view looking toward the entrance of my improved theatre and projection booth.

At one side of the booth as indicated at 22, Fig. 2, is provided an entrance turnstile. This turnstile is preferably of the coin-controlled type, as the attendant can make change more rapidly than collect admissions, and patrons may then readily admit themselves through the turnstile by the insertion of the proper coin. This turnstile is of the type which may be actuated in the reverse direction to permit exit of the audience, and it is preferably provided with a locking mechanism by which the operator may lock it to prevent further admissions without locking it to prevent exit.

The turnstile 23 provided at the opposite side of the booth may be of the same type as 22 but, since my invention is particularly adapted to theatres of limited seating capacity, a high speed of admission is not necessary. I therefore prefer to make the turnstile 23 of the simple ratchet type permitting exit of the patrons but not permitting entrance.

As before stated, my improved theatre is intended to run an entire show on a single reel of film. This makes it necessary to provide two duplicate reels one of which may be rewound while the other is being exhibited; or to rewind the film (preferably by means of a high-speed rewinder incorporated in the projector mechanism, as is known in the art) during a brief intermission. If the latter procedure is used, it is desirable that the theatre be lighted to permit and encourage the ready changing of the audience at the conclusion of a show, and it is also desirable that incidental music be provided during such time as well as during the initial seating of the audience when the theatre is opened.

I accordingly provide a phonograph apparatus 24 which is preferably of the electrically-driven disc type having a magnetic pick-up, and the output from this phonograph is fed to the amplifier 2, and from there to the loudspeakers located at the rear of the projection screen. This phonograph may be provided with an automatic stop mechanism so connected as to stop the phonograph and start the projector at the conclusion of a record of predetermined length. If the discs used are of the eccentric-groove type such as the Victrola automatic-stop records, this mechanism may consist of a ratchet mechanism actuating a double-throw snap switch on the return swing of the arm. Such a mechanism is illustrated in Fig. 6, wherein the base housing the drive-mechanism is indicated at 50, the turn-table at 51, and the disc record at 52. The eccentric groove is indicated at 53. The magnetic pickup 54 is carried by the arm 55 which is pivoted in the usual manner and contains the leads from the pickup.

To the arm 55 is pivotally attached an arm 56 which actuates the switch 57 in a manner shown in more detail in Fig. 7. The arm 56 is held down on the switch 57 by the spring 58.

As shown in Fig. 7, the arm 56 is provided with ratchet teeth 59 adapted to co-operate with corresponding teeth on the curved end of the switch-arm 60. The arm 56 is held in alignment with the switch-arm 60 by the side plates 61. One side of the power-supply line is, as indicated, connected to the movable blade 64 of the switch, and the jaws 62 and 63 of the switch are respectively connected to the phonograph motor and the projector lamp and drive motor. The house lights of the theatre may also be connected to the jaw 62 so they will be extinguished on the starting of the projector.

It will be apparent that as long as the arm 55 continues to move toward the left, the ratchet teeth 59 will slip over teeth on the arm 60, but upon movement of the arms 55 and 56 toward the right the switch-arm 60 will be immediately moved to the right, stopping the phonograph and starting the projector.

If desired, an additional switch-arm may be provided on the switch 57 to switch the amplifier input from the phonograph to the sound pick-up of the projector.

Automatic mechanism may be provided for projecting lantern slides concurrently with the phonograph music.

In the projection booth is provided a switch 25 serving to control the lights of the room. It will be apparent that the single attendant thus may, at the conclusion of the reel of film, turn on the house lights by means of the switch 25 and provide the necessary incidental music by means of the phonograph 24 during the time of rewinding of the film through the projector or in case of any interruption to the show.

It will be apparent that the gate members 4 may be made hollow and that the connection from the switch 25 to the main light circuit may be made through the leads 26 passing through one of the members 24, while the leads 27 provide current for the projector, amplifier, etc. may pass through the other of the members 4 as shown in Fig. 1.

It obviously is desirable for the attendant to be able to inspect the audience to determine when all seats are filled and to locate any vacant seats. In the form of the device shown in Fig. 1, this may be readily accomplished to a certain extent if the attendant looks over the top of the projector or from the side thereof into the mirror 9. However, this gives a relatively limited field of view, and I therefore prefer to mount a small mirror 30 on the front wall of the booth close to the mirror 5 and in such a position as to permit the attendant to have a good view of the entire audience through the reflection thereof of the mirror 5. This arrangement provides a novel and unexpected advantage, to wit: If the mirror 5 becomes appreciably soiled, as by dust, dirt, or finger-marks, the high intensity beam from the projector is diffusely reflected to such an extent that the light thus reflected is greater than the slight illumination of the audience. The attendant is therefore obliged to keep the mirror 5 scrupulously clean in order to see the audience, and this insures a high quality of projection.

It will be apparent that one of the advantages of my apparatus is the facility with which it may be installed or removed. The installation thereof requires only the placing of the booth 3 in the entrance of an appropriate place such as the type of room customarily used for a small store or the like, the connection of the power lines, the placing of the connection from the amplifier to the loudspeakers behind the screen, which connection is preferably in the form of a shielded flexible cable, the hanging of the projection screen, and the adjustment of the device; while the removal thereof is even more expeditious.

It is also evident that my inventions herein described are not exclusively applicable to 16 mm. film, but may be used with film of any convenient size or type.

Having thus described my invention, I claim:

1. A unitary device comprising a booth adapted to be located at the entrance of a theatre, picture projector apparatus within said booth, means in said booth whereby the operator of the picture projector apparatus may control admissions to the theatre, and means in said booth for adjusting the length of the optical path from the projector to the screen, the position of the picture on the screen, and for maintaining the vertical angle of projection toward the screen constant including means for independently adjusting the height of the projector from the floor, whereby the said booth as a unit may be used in conjunction with theatres of different sizes.

2. A unitary device comprising a booth adapted to be located at the entrance of a theatre, picture projector apparatus within said booth, means in said booth whereby the operator of the picture projector apparatus may control admissions to the theatre, and means in said booth for adjusting the length of the optical path from the projector to the screen, the position of the picture on the screen, and for maintaining the vertical angle of projection toward the screen constant including means for independently adjusting the height of the projector from the floor, and phonographic apparatus within said booth adapted to actuate a sound reproducer at the projection screen in the theatre, whereby the said booth as a unit may be used in conjunction with theatres of different sizes.

3. A unitary device comprising a booth adapted to be located at the entrance of a theatre, picture projector apparatus within said booth, means in said booth whereby the operator of the picture projector apparatus may control admissions to the theatre, and means in said booth for adjusting the length of the optical path from the projector to the above screen, the position of the picture on the screen, and for maintaining the vertical angle of projection toward the screen constant including means for supporting the projector, whereby the said booth as a unit may be used in conjunction with theatres of different sizes.

4. A unitary device comprising a booth adapted to be located at the entrance of a theatre, picture projector apparatus within said booth, means in said booth whereby the operator of the picture projector apparatus may control admissions to the theatre, and means in said booth for adjusting the length of the optical path from the projector to the screen, the position of the picture on the screen, and for maintaining the vertical angle of projection toward the screen constant including means for supporting the projector, and phonographic apparatus within said booth adapted to actuate a sound reproducer at the projection screen in the theatre, whereby the said booth as a unit may be used in conjunction with theatres of different sizes.

ALFRED N. GOLDSMITH.